(12) United States Patent
Winklhofer et al.

(10) Patent No.: US 6,320,184 B1
(45) Date of Patent: Nov. 20, 2001

(54) OPTOELECTRIC MEASURING DEVICE FOR MONITORING COMBUSTION PROCESSES

(75) Inventors: Ernst Winklhofer, St. Johann ob Hohenburg; Harald Arnulf Philipp, Wegersfeld, both of (AT); Michael Kreitel, Berlin (DE)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/350,280

(22) Filed: Jul. 9, 1999

(30) Foreign Application Priority Data

Jul. 9, 1998 (AT) .................................................. GM 458

(51) Int. Cl.[7] ................................. G01J 5/08; H01J 5/16
(52) U.S. Cl. .................................. 250/227.11; 250/227.2; 250/554
(58) Field of Search ........................... 250/227.11, 227.2, 250/227.24, 227.28, 231.1, 554, 330, 338.1, 339.15, 339.14; 356/213, 218, 477, 478, 479; 374/120, 121, 130, 131

(56) References Cited

U.S. PATENT DOCUMENTS 4,978,850 * 12/1990 Nakamura et al. ............. 250/227.11
5,384,467 * 1/1995 Plimon et al. ....................... 250/554
5,463,222 * 10/1995 Lesko et al. ......................... 250/330

FOREIGN PATENT DOCUMENTS 0313884   5/1989   (EP).
2294318   4/1996   (GB).

OTHER PUBLICATIONS

Patent Abstracts of Japan, vol. 10, No. 216 (M–502) [2272] of JP 61–055312 entitled "Detector for Flame Figure in Combustion Chamber of Reciprocating Internal–Combustion Engine" of Kazuhiko Nagase.
Patent Abstracts of Japan, vol. 9, No. 191 (M–402) [1914] of JP 60–056150 entitled "Controller for Engine" of Teruyuki Itou.

* cited by examiner

Primary Examiner—John R. Lee
(74) Attorney, Agent, or Firm—Dykema Gossett PLLC

(57) ABSTRACT

An optoelectronic measuring device for monitoring combustion processes in a combustion chamber of an internal combustion engine during operation is provided with optical sensors which are connected to an evaluation unit. The optical sensors may be located in a seal element bounding the combustion chamber. To obtain high measuring quality in a simple manner, the optical sensors each include a lens assembly having a focusing lens whose flat end opposite the combustion chamber is coincident with the focal plane of the focusing lens and is abutted by an end of at least one optical fiber.

17 Claims, 2 Drawing Sheets

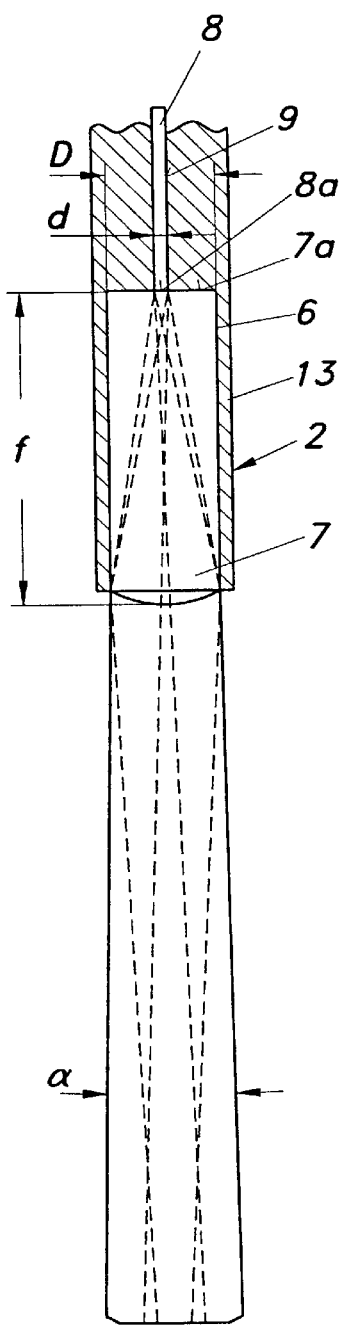
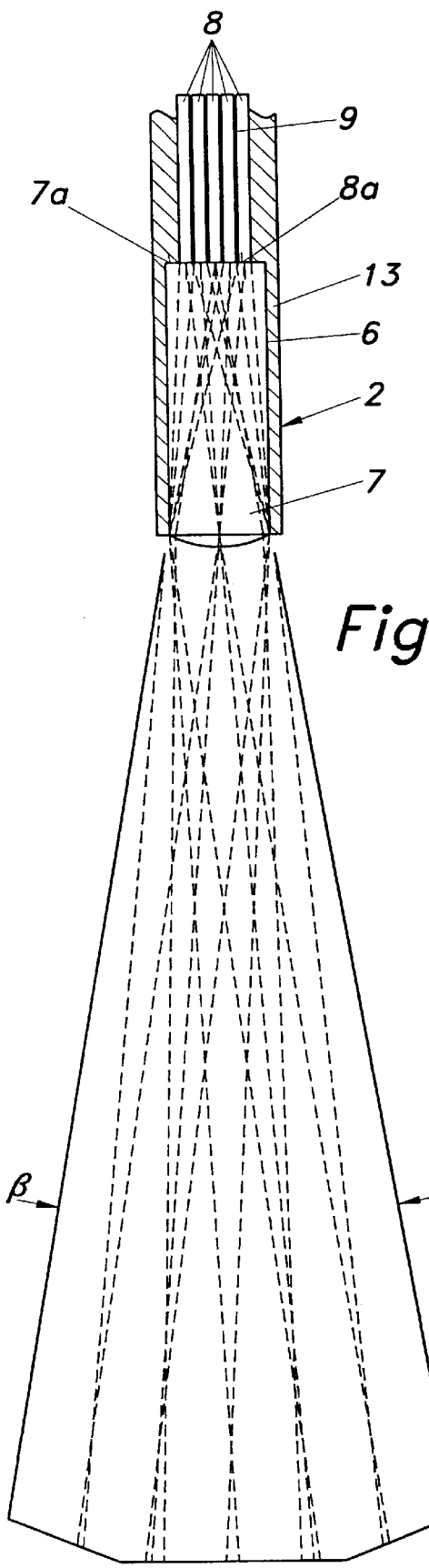
Fig.2
Fig.3

OPTOELECTRIC MEASURING DEVICE FOR MONITORING COMBUSTION PROCESSES

BACKGROUND OF THE INVENTION

The invention relates to an optoelectronic measuring device for monitoring combustion processes in the combustion chamber of an internal combustion engine during operation, with optical sensors assigned to the combustion chamber, which are connected to an evaluation unit, each sensor being provided with a lens assembly at its point of entrance into the combustion chamber, which lens assembly is in optical contact with at least one optical fiber and includes a plano-convex lens as focusing lens, and an end of at least one optical fiber being positioned in a focal plane of the focusing lens.

DESCRIPTION OF THE PRIOR ART

In EP 0 593 413 B1 an optoelectronic measuring device is disclosed wherein each optical sensor is configured as a spherical lens mounted in a frame, which lens is in optical contact with an optical fiber guided in the frame. By means of the distance between optical fiber and spherical lens the magnitude of the sensor's angle of view is adjusted. A spherical lens represents only a rough approximation of an optical lens, however. As the viewing angle of each individual sensor will be quite restricted, a large number of optical sensors are required to fully cover the area of the combustion chamber lying in the cutting plane of the seal element.

In other known optoelectronic measuring devices for detecting combustion processes in the combustion chamber the lightguides are optically connected to the combustion chamber without interposing a lens (see EP 0 313 884 A2, FIGS. 6 and 7, for example). In this way only a very small part of the capacity of an optical fiber can be put to use, however, and the residual radiation captured must usually be amplified, which will complicate the measuring process and reduce the quality of measured results.

A device for detecting and evaluating knocking combustion during operation of an internal combustion engine is known from EP 0 313 884 A2, FIG. 4. The optical sensor of the device comprises a plano-convex lens adjacent to the combustion chamber, a tube and a waveguide cable containing optical fibers. At the remote end of the tube facing away from the combustion chamber an aperture is disposed in the focal plane of the lens, which is formed by the entrance cross-sections of the optical fibers. The walls of the tube are surface-coated with light-absorbing material on the inside. By means of the lens next to the combustion chamber the light rays are focused in the focal plane and coupled into the waveguide cable.

A similar device is described in JP Abstract 61-055312, where a plano-convex lens is located at the end of a bore opening into the combustion chamber. At the remote end of the bore facing away from the combustion chamber the end of an optical fiber is located in the focal plane of the lens, which is used for detection of the combustion processes in the combustion chamber. A very similar device for analysing incomplete combustion in internal combustion engines is discussed in JP Abstract 60-56150.

In GB 2 294 318 A, finally, a pyrometer probe is described, which includes an optical fiber and a plano-convex lens placed at a distance therefrom, which is defined by the focal length of the lens. The lens is made from sapphire or some other material having similar optical properties.

SUMMARY OF THE INVENTION

It is an object of this invention to overcome the disadvantages of known devices and to improve an optoelectronic measuring device of the type referred to above such that high-quality measuring results will be obtained in a simple, inexpensive manner.

According to the invention this object is achieved by providing that the focal plane of the focusing lens coincide with the plane face of the plano-convex lens, the end of at least one optical fiber being in direct contact with the plane face. Instead of a plano-convex lens two single lenses may be provided, which are placed at a distance from each other, of which the single lens closer to the optical fiber will serve as focusing lens. To maintain a constant distance between the two single lenses, a light-transmissive intermediate piece is advantageously disposed between the two single lenses. It is an advantage of the invention that the individual optical fibers need not be especially aligned in the focal plane but may be directly placed in contact with the plane face of the plano-convex lens. In this manner a simple and compact design is obtained where maximum use of the opening angle of the glass fiber is ensured even if the lens diameter is kept extremely small.

This particular arrangement of lens assembly and optical fiber will permit monitoring of the flamelight of combustion processes from different regions of the combustion chamber. The viewing angle obtainable is determined by the ratio of the diameter of the optical fiber and the focal length of the lens. The increased sensitivity of the sensor, which is higher for similar viewing angles than that of known measuring devices without a lens assembly, is derived from the ratio of lens diameter and focal length. As a consequence, light intensities will be obtained that are greater by a factor of up to 100 for similar angles of view.

The individual optical sensors may be located in bores of the cylinder or cylinder head of an internal combustion engine, but are most advantageously positioned in a seal element bounding the combustion chamber, which element is located in a cutting plane through the combustion chamber. In this way the engine structure need not be altered.

It is provided in a preferred variant of the invention that the ends of several optical fibers be located as a fiber bundle in the focal plane of the focusing lens. The viewing angle of the visual rays of the individual fibers is derived from the ratio of the distance between the centers of the optical fibers and the focal length of the focusing lens. Advantageously, the ends of the optical fibers may be placed substantially in the cutting plane. In addition to this arrangement, or instead of it, provisions may be made for the ends of at least two optical fibers to be situated substantially in a plane normal to the cutting plane of the seal element. A particularly large angle of view is obtained if the ends of several optical fibers are arranged in a line, each at substantially the same distance from the other, and if the individual viewing angles combine to form a fan.

It is proposed in further development of the invention that the optical fibers of each optical sensor be coated and that focusing lens and optical fibers be integrated in a sensor jacket.

Suitable materials for the focusing lens are quartz glass and sapphire. For transmissions in the ultraviolet region, for example for detection of ultraviolet molecule bands (OH, NO, or CH) and measurements in the infrared region, quartz glass may be used. Sapphire lenses are resistant to extreme pressures and temperatures, and may be employed in high-performance gas engines, for instance.

High measuring quality is achieved with optical fibers made of quartz glass. Advantageously, the fibers are coated with polymer or silicone-type materials, polyamide or metal. Polymer coatings may be used for low-temperature applications up to 80° C. Above that range, i.e., up to 180° C., silicone-type coatings may be employed. Polyamide-coated glass fibers are heat-resistant up to 385° C. and are covered by extremely thin jackets to enable them to be packed into the sensor as tightly as possible. For extreme temperature loads of up to 750° C. metal coatings are recommended.

In order to obtain a resistant and durable application it is proposed that the optical fibers be permanently attached to the lens by means of an adhesive, preferably an epoxy adhesive or glass ceramic. Such adhesives are also suitable for bonding the sensor to the measuring site, for example, in the seal element. It would also be possible to integrate focusing lens, optical fibers and, if provided, sensor jacket in a high-temperature-resistant body of quartz glass by diffusion welding or laser welding techniques.

BRIEF DESCRIPTION OF THE DRAWINGS

The invention will now be further described with reference to the accompanying drawings, in which FIG. 2 is a partial section of an optical sensor in accordance with FIG. 1, FIG. 3 shows an optical sensor in analogy to FIG. 2, in another variant of the invention.

DETAILED DESCRIPTION OF PREFERRED EMBODIMENTS

Figure 1:
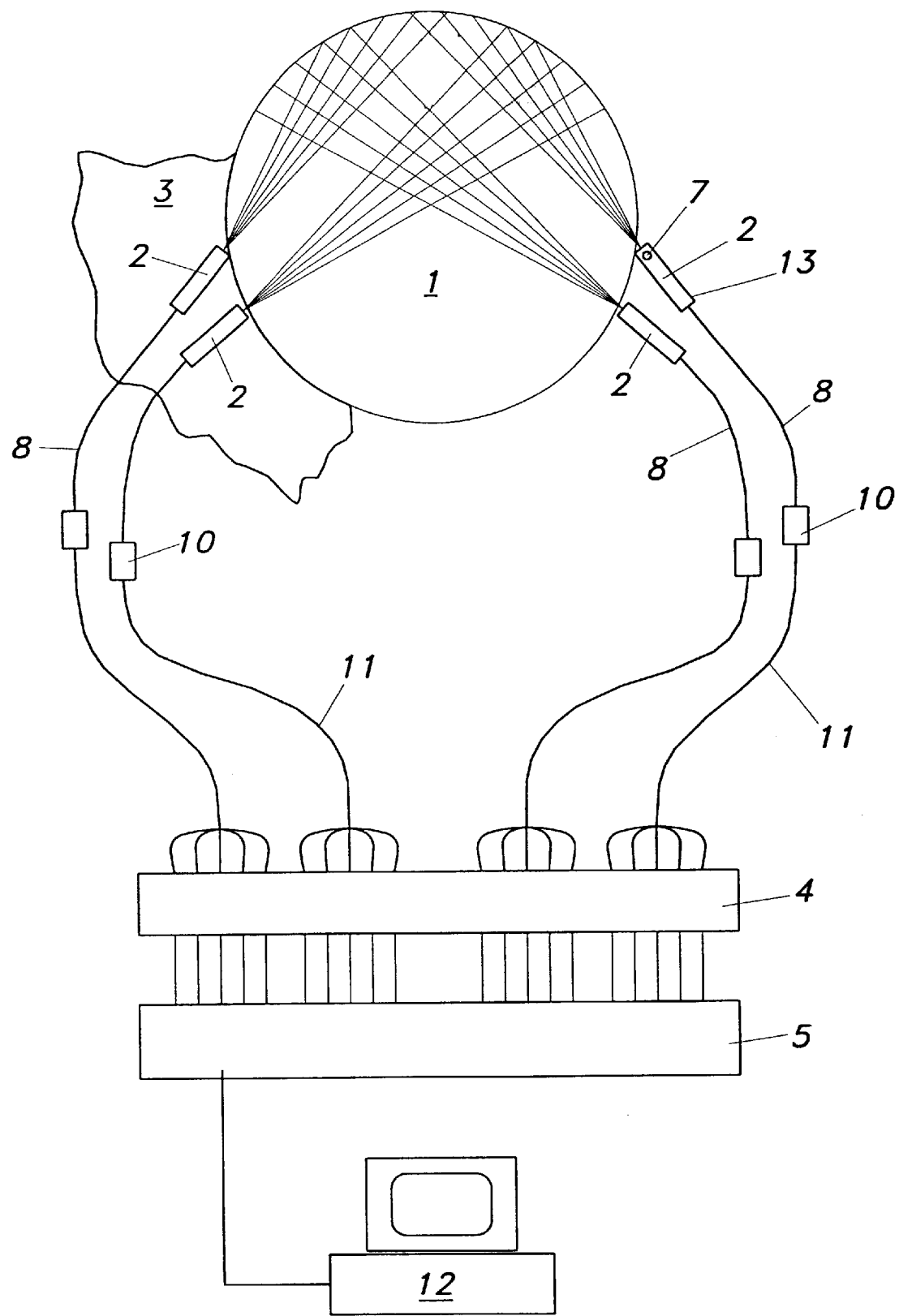
FIG. 1 is a schematical representation of an embodiment of an optoelectronic measuring device for monitoring combustion processes in an internal combustion engine.

FIG. 1 presents a variant of an optoelectronic measuring device for monitoring combustion processes in the combustion chamber 1 of an internal combustion engine not shown in the drawing, including a plurality of optical sensors 2, which may be integrated in a seal element 3, such as a cylinder head gasket. The individual sensors 2 pick up the light arriving from the combustion chamber 1 via the focusing lens 7 shown in more detail in FIGS. 2 and 3, which is connected to optical fibers 8 guided in a steel capillary, for example. The detected light is transmitted to an evaluation unit 12 by way of connectors 10 and further optical fibers 11, via a unit 4 with photodiodes and amplifiers as well as a storage unit 5.

As is shown in FIG. 2, the individual sensors 2 pick up the light arriving from the combustion chamber by means of a lens assembly 6 including a focusing lens or cylinder-shaped lens 7 configured as a plano-convex lens. The focusing lens 7, which may be made from quartz or sapphire, is in optical contact with an optical fiber 8, such as a glass fiber provided with a coating 9. The viewing angle α of the sensor 2 corresponds to the ratio of diameter d of the optical fiber 8 and focal length f of the focusing lens 7. Within this angular range α light from the combustion chamber can be detected and coupled into the optical fiber 8. It is essential that the end 8a of the optical fiber should be located in the focal plane 7a of the focusing lens, such that the light rays passing through the lens 7 will be focused onto the end 8a of the optical fiber 8, and a precise image of the corresponding area of the combustion chamber will be coupled into the optical fiber 8.

By way of the optical fibers 8 supplied as glass fibers, for instance consisting of quartz glass, the light is transmitted via connectors 10 and another optical fiber 11 to a detector-amplifier unit located in an evaluation unit 12 (FIG. 1) and is converted into an electrical signal.

To ensure that the end 8a of the optical fiber 8 is precisely located in the focal plane 7a of the lens 7, a plano-convex lens is used whose focal plane 7a coincides with the plane face of the plano-convex lens, such that the optical fiber is aligned by direct contact with the plane end face of the lens.

The diameter D and focal length f of the lens 7 are chosen so as to ensure optimum use of the aperture or diameter d of the optical fiber 8.

In the variant shown in FIG. 3 several optical fibers 8 are placed side by side or as a bundle in the focal plane 7a of the lens 7. The viewing angles of the individual visual rays combine to form a viewing angle β which is determined by the ratio of the distance between the centers of two adjacent optical fibers 8 and the focal length f of the focusing lens 7. To obtain a wide-spread fan of viewing angles in a cutting plane, the optical fibers 8 may be arranged in a line, ideally each within the same distance of the other.

The optical fibers 8 constituted by glass fibers have coatings of polymer or silicone-type materials, polyamide or metal, the coated fibers and the lens assembly 6 being bonded by an adhesive and combined into a sensor 2 covered by a sensor jacket 13. Polymer coatings may be used up to 80° C. approximately, whilst silicone-type coatings are heat-resistant up to about 180° C. For higher temperatures polyamide-coated glass fibers are employed, which will resist temperature loads of up to 350° C. and whose jackets 9 are very thin to enable the glass fibers to be packed into the sensor 2 most tightly. Metal-coated glass fibers are suited for use with extreme temperature loads of up to 750° C.

The lens assembly 6 may consist of quartz glass to permit transmissions in the ultraviolet and infrared regions. Focusing lenses made of quartz glass may be employed for ultraviolet transmission, for instance, to measure ultraviolet molecule bands of OH, NO, or CH.

Focusing lenses 7 made of sapphire may be employed under conditions of extreme pressure or temperature, for example in high-performance gas engines.

The sensors 2 may be permanently attached to the seal element 3, in which instance the sensors 2 comprising lens assembly 6 and optical fiber 8 each are inserted into a bore 3a of the seal element 3 and bonded to the seal element 3 by means of an adhesive.

Suitable adhesives are high-temperature epoxy adhesives for engine applications or glass ceramic for high-temperature applications, such as in gas turbines. With the use of the optoelectronic measuring device in accordance with the invention it will be possible to observe the flame light arriving from different regions of the combustion chamber of an internal combustion engine in a simple and inexpensive manner while ensuring a high measuring quality.

What is claimed is:

1. Optoelectronic measuring device for monitoring combustion processes in a combustion chamber of an internal combustion engine during operation, with optical sensors being assigned to said combustion chamber each defining a point of entrance, which optical sensors are connected to an evaluation unit, each of said sensors being provided with a lens assembly at said point of entrance into said combustion chamber, which lens assembly is in optical contact with at least one optical fiber and includes a plano-convex lens as focusing lens, and an end of at least one optical fiber being positioned in a focal plane of said focusing lens, wherein said focal plane of said focusing lens coincides with a plane face of said plano-convex lens, and said end of said at least one optical fiber is in direct contact with said plane face.

2. Measuring device as claimed in claim 1, wherein said optical sensors are positioned in a seal element bounding said combustion chamber, and said seal element is located in a cutting plane going through said combustion chamber.

3. Measuring device as claimed in claim 2, wherein the ends of at least two of said optical fibers are situated in said cutting plane of said seal element.

4. Measuring device as claimed in claim 2, wherein the ends of at least two of said optical fibers are situated in a plane normal to said cutting plane of said seal element.

5. Measuring device as claimed in claim 1, wherein the ends of several optical fibers are located as a fiber bundle in said focal plane of said focusing lens.

6. Measuring device as claimed in claim 1, wherein the ends of several optical fibers are arranged in a line, each at substantially the same distance from the other, and wherein the individual viewing angles combine to form a fan $\beta$.

7. Measuring device as claimed in claim 1, wherein said optical fibers of each of said optical sensors are coated and said focusing lens and said optical fibers are integrated in a sensor jacket.

8. Measuring device as claimed in claim 1, wherein said focusing lens of said lens assembly is made of quartz glass.

9. Measuring device as claimed in claim 1, wherein said focusing lens is a sapphire lens.

10. Measuring device as claimed in claim 1, wherein each of said optical fibers is constituted by at least one fiber made of quartz glass .

11. Measuring device as claimed in claim 1, wherein said optical fibers are provided with a coating material of a group consisting of polymer, silicone materials, polyamide and metal.

12. Measuring device as claimed in claim 1, wherein said optical fibers are permanently attached to said focusing lens by means of an adhesive.

13. Measuring device as claimed in claim 12, wherein said adhesive is an epoxy adhesive.

14. Measuring device as claimed in claim 12, wherein said adhesive is glass ceramic.

15. Measuring device as claimed in claim 1, wherein said focusing lens and said optical fibers are integrated in a high-temperature-resistant body of quartz glass by diffusion welding or laser welding techniques.

16. Measuring device as claimed in claim 15, wherein a sensor jacket is also integrated in said high-temperature-resistant body of quartz glass.

17. A combination of an internal combustion engine defining a combustion chamber and an optoelectric measuring device for monitoring combustion processes within said combustion chamber, said optoelectric measuring device comprising:

an evaluation unit, a lens assembly positioned at an entrance to said combustion chamber, said lens assembly including a cylindrical plano-convex lens which defines a convex end facing said combustion chamber so as to directly view an interior of said combustion chamber and an opposite flat end, said flat end coinciding with a focal plane of said lens, and an optical fiber which extends between said lens and said evaluation unit and includes an end in direct contact with said flat end of said plano-convex lens.

* * * * *